US011192817B2

(12) United States Patent
Ono

(10) Patent No.: US 11,192,817 B2
(45) Date of Patent: Dec. 7, 2021

(54) REINFORCED GLASS

(71) Applicant: AGC Inc., Chiyoda-ku (JP)

(72) Inventor: Madoka Ono, Tokyo (JP)

(73) Assignee: AGC Inc., Chiyoda-ku (JP)

(*) Notice: Subject to any disclaimer, the term of this patent is extended or adjusted under 35 U.S.C. 154(b) by 6 days.

(21) Appl. No.: 16/740,529

(22) Filed: Jan. 13, 2020

(65) Prior Publication Data

US 2020/0148581 A1 May 14, 2020

Related U.S. Application Data

(63) Continuation of application No. PCT/JP2018/026962, filed on Jul. 18, 2018.

(30) Foreign Application Priority Data

Jul. 18, 2017 (JP) .............................. JP2017-138873

(51) Int. Cl.
*C03C 3/091* (2006.01)
*C03C 23/00* (2006.01)
*C03C 21/00* (2006.01)

(52) U.S. Cl.
CPC ............ *C03C 3/091* (2013.01); *C03C 23/007* (2013.01); *C03C 21/001* (2013.01)

(58) Field of Classification Search
CPC ...... C03C 3/091; C03C 23/007; C03C 21/001
See application file for complete search history.

(56) References Cited

U.S. PATENT DOCUMENTS

| 2002/0068678 A1 | 6/2002 | Seto et al. |
| 2014/0226090 A1* | 8/2014 | Akiba ................... C03C 21/002 349/12 |

FOREIGN PATENT DOCUMENTS

| JP | 2000-103632 A | 4/2000 |
| JP | 2003-119048 A | 4/2003 |
| WO | WO 2015/111524 A1 | 7/2015 |
| WO | WO-2015111524 A1 * | 7/2015 ............. C03C 3/089 |

OTHER PUBLICATIONS

Kikuta, M, et al., "The Relationship between Fracture Pattern and Fracture Stress on Float Glass", Journal of the Ceramic Association, Japan , Mar. 1, 1985, vol. 93, No. 3, pp. 144-150 (with English Abstract) (Year: 1985).*
Varner, JR, and HJ Oel. "Surface Defects: Their Origin, Characterization and Effects On Strength." Glass Surfaces. Elsevier, 1975. 321-333. (Year: 1975).*

(Continued)

*Primary Examiner* — Karl E Group
*Assistant Examiner* — Cameron K Miller
(74) *Attorney, Agent, or Firm* — Oblon, McClelland, Maier & Neustadt, L.L.P.

(57) ABSTRACT

A strengthened glass has a mirror constant A of 1.97 MPa·m$^{0.5}$ or less, a surface compressive stress (CS) of 10 MPa or more. A product (t×CS) of a sheet thickness t (unit: mm) and the CS (unit: MPa) is less than 230. The strengthened glass may have a fictive temperature at a central portion in a sheet thickness t direction of not lower than a glass transition temperature Tg and Tg+100° C. or lower.

20 Claims, 2 Drawing Sheets

(56) References Cited

OTHER PUBLICATIONS

International Search Report dated Oct. 2, 2018 in PCT/JP2018/026962 filed on Jul. 18, 2018 (with English Translation), 5 pages.
Kikuta, M, et al., "The Relationship between Fracture Pattern and Fracture Stress on Float Glass", Journal of the Ceramic Association, Japan , Mar. 1, 1985, vol. 93, No. 3, pp. 144-150 (with English Abstract).

* cited by examiner

REINFORCED GLASS

TECHNICAL FIELD

The present invention relates to a strengthened glass. More specifically the present invention relates to a strengthened glass for use as a window glass for an automobile.

BACKGROUND ART

Strengthened glasses are used as window glasses (excluding front glasses) for automobiles. In this case, regulations govern cracking of strengthened glass sheets to enhance safety in order to prevent drivers or passengers from getting injured. Strengthened glass sheets which do not satisfy performance defined by the regulations cannot be used as windows glasses for automobiles.

For example, the regulations governing strengthened glasses for automobile windows include a regulation for condition of crushed pieces when local impact is applied to a strengthened glass. Specifically, crushed pieces of a glass sheet cracked by impact are required to be formed into small granular pieces not to cause any sharp fragment as regular glasses do (Patent Literature 1).

FIG. 1 is a view showing an example of a glass with large crushed pieces, and FIG. 2 is a view showing an example of a glass with small granular crushed pieces. The glass with small granular crushed pieces shown in FIG. 2 is preferred as a window glass for an automobile.

In recent automobiles, reduction in weight is required to reduce fuel consumption and the like. Accordingly, a request to reduce the thickness of a glass sheet to reduce the weight thereof is increased. However, when the sheet thickness is reduced to meet the request of reduction in weight, a surface compressive stress (CS) is not increased, and consequently an internal tensile stress (CT) is not increased. Thus, there is a problem that crushed pieces are large in size to cause a danger.

CITATION LIST

Patent Literature

Patent Literature 1: JP-A-2000-103632

SUMMARY OF INVENTION

Technical Problem

In order to solve the problem in the background art, the present invention takes the aforementioned situation into consideration, and an object of the present invention is to provide a strengthened glass in which crushed pieces are small even when the strengthened glass has a thin sheet thickness.

Solution to Problem

In order to attain the aforementioned object, the present invention provides a strengthened glass having a mirror constant A of 1.97 MPa·m$^{0.5}$ or less, a surface compressive stress (CS) of 10 MPa or more, wherein a product (t×CS) of a sheet thickness t (unit: mm) and the CS (in units of MPa) is less than 230.

Advantageous Effects of Invention

In the strengthened glass according to the present invention, even when the sheet thickness is thin, the surface compressive stress is not too large, and crushed pieces are small. When the strengthened glass is cracked, the crushed pieces have small granular shapes. Therefore, the strengthened glass according to the present invention is suitable as a window glass for an automobile.

DESCRIPTION OF EMBODIMENTS

An embodiment of a strengthened glass according to the present invention is described below.

A method of a strengthening treatment for the strengthened glass according to the present invention is not particularly limited. The strengthened glass may be an air-cooled tempered glass subjected to an air-cooling tempering treatment or a chemically strengthened glass subjected to a chemically strengthening treatment.

However, when the strengthened glass is used as a window glass for an automobile, it is preferable that the strengthened glass is an air-cooled tempered glass in consideration of the cost.

In the present description, a crushed piece density measured in the procedure described in examples which is described later is used as an index expressing that crushed pieces are small and granular. When crushed pieces are small and granular, the crushed piece density increases. Here, the crushed piece density is defined by the number of crushed pieces per 100 cm$^2$. The crushed piece density is preferably 4 or more, and more preferably 10 or more. In order to keep the shape of a glass as a whole, the crushed piece density is preferably 2,000 or less, and more preferably 1,500 or less.

Figure 1:
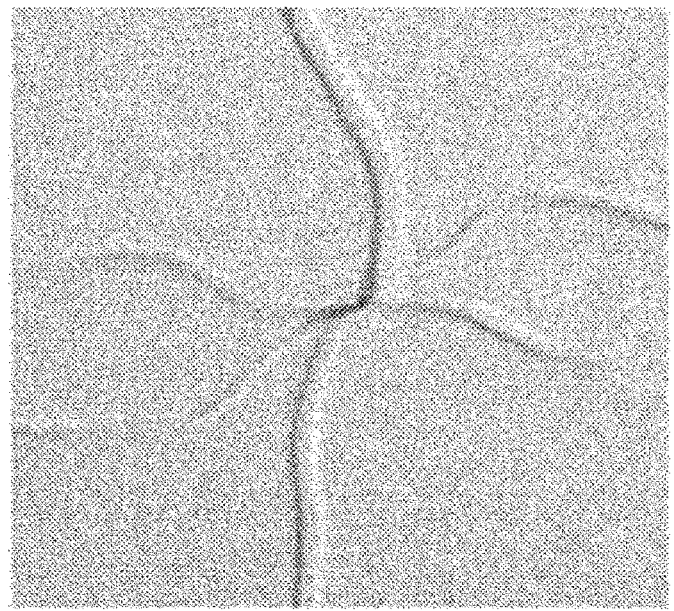
FIG. 1 is a view showing an example of a glass with large crushed pieces.
Figure 2:
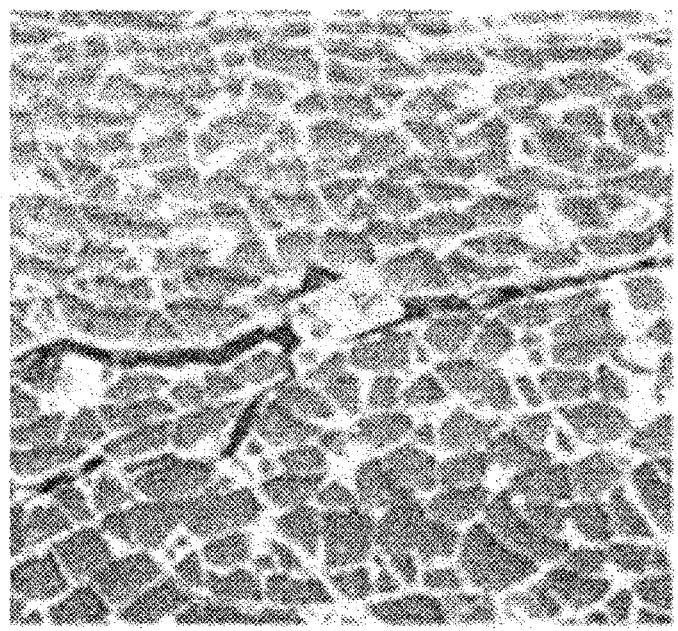
FIG. 2 is a view showing an example of a glass with small crushed pieces.
Figure 3:
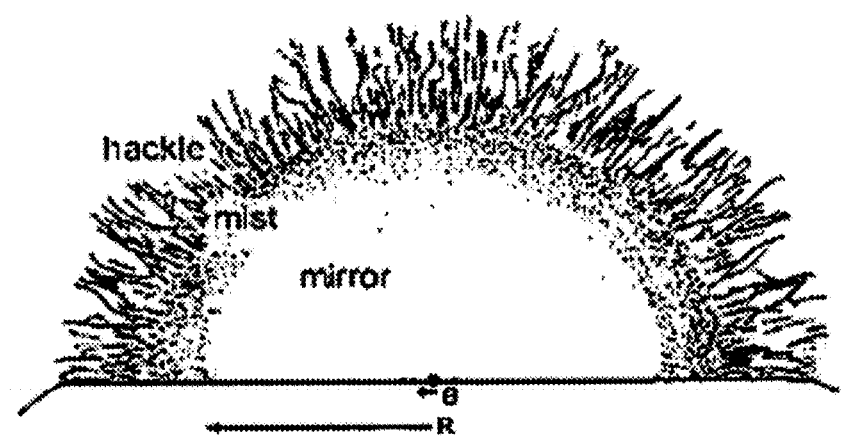
FIG. 3 is a view schematically showing how a glass having no residual stress internally cracks in the vicinity of a fracture origin when the glass is destroyed by a tensile stress.

When a glass is cracked, it is known that the shape of a fracture surface thereof depends on the magnitude of a stress. FIG. 3 schematically shows how a glass having no residual stress internally, that is, a glass which is subjected to a strengthening treatment cracks in the vicinity of a fracture origin when the glass is destroyed by a uniform tensile stress.

In FIG. 3, a smooth surface called a mirror surface appears in the vicinity of the fracture origin shown by the black dot. In addition, a slightly rough boundary surface called a mist appears around the mirror surface. A rough surface called a hackle appears outside the mist. In FIG. 3, assume that R (unit: m) designates a distance from the fracture origin shown by the black dot to the boundary between the mirror surface and the mist surface, and σ (unit: MPa) designates a stress causing the fracture. It is known that σ is proportional to a reciprocal of a square root of R. A proportional constant thereof is a mirror constant A (unit: MPa·m$^{0.5}$). That is, the relationship shown by the following expression is established.

$$\sigma = A/R^{1/2}$$

The mirror constant A can be experimentally obtained by measuring the stress σ at the time of fracture and the distance R from the fracture origin to the interface between the mirror surface and the mist surface.

Therefore, in the background art, when a glass used in the market was crushed, a mirror constant was examined for analyzing the stress which might be loaded on the glass. On the other hand, as a result of diligent investigation, the present inventor found that the crushed piece density with which a glass is crushed has a relation to the mirror constant A of the glass based on similarity between a phenomenon that fracture branches when the glass is crushed and a phenomenon that a mirror surface leads to a mist or a hackle, and a glass having a small mirror constant A has a high crushed piece density so that crushed pieces are small and granular when the glass is cracked.

A glass having a small mirror constant A has a high crushed piece density so that crushed pieces are small and granular when the glass is cracked. Also in a strengthened glass, a crack tip is a part where the tensile stress is the largest of the glass, that is, a central portion in the thickness direction which is hardly affected by a strengthening treatment. Therefore, how to crack depends on the characteristics of the glass before the strengthening treatment. Thus, a glass (strengthened glass) obtained by the strengthening treatment performed on the glass having a small mirror constant A before the strengthening treatment is high in crushed piece density, and crushed pieces are small and granular when the glass is cracked.

The mirror constant A remains unchanged before and after the strengthening treatment. In the present description, the mirror constant A obtained from the glass before the strengthening treatment is used as the mirror constant A of the glass (strengthened glass) subjected to the strengthening treatment.

The strengthened glass according to the present invention has a mirror constant A of 1.97 MPa·m$^{0.5}$ or less. Accordingly, crushed pieces are small and granular when the glass is cracked.

The mirror constant A of the strengthened glass according to the present invention is preferably 1.92 MPa·m$^{0.5}$ or less, more preferably 1.87 MPa·m$^{0.5}$ or less, even more preferably 1.82 MPa·m$^{0.5}$ or less, and particularly preferably 1.76 MPa·m$^{0.5}$ or less. The lower limit of the mirror constant A is not particularly limited. However, when the mirror constant A is too low, there is a risk that the glass is crushed. Therefore, the mirror constant A is preferably 1.0 MPa·m$^{0.5}$ or more.

The strengthened glass according to the present invention has a surface compressive stress (CS) of 10 MPa or more. When the surface compressive stress (CS) is 10 MPa or more, the surface fracture density can be increased. The surface compressive stress (CS) of the strengthened glass according to the present invention is preferably 50 MPa or more, more preferably 60 MPa or more, even more preferably 70 MPa or more, further more preferably 80 MPa or more, particularly preferably 90 MPa or more, and most preferably 100 MPa or more. The upper limit of the surface compressive stress (CS) is not particularly limited. However, a high CS matches with a high internal tensile stress. As the CS is higher, higher energy is internally accumulated by the tensile stress so that the energy to be released at the time of fracture can be increased dangerously. Therefore, the CS is preferably 2,500 MPa or less.

In the strengthened glass according to the present invention, a product (t×CS) of a sheet thickness t (unit: mm) and the surface compressive stress CS (unit: MPa) is less than 230. When t×CS is less than 230, the weight of the strengthened glass can be reduced. In addition, the strengthened glass is hardly self-exploded when impact is applied to the strengthened glass. t×CS is preferably 220 or less, more preferably 215 or less, even more preferably 210 or less, particularly preferably 205 or less, and most preferably 200 or less.

Pay attention to the relationship between the physical properties of a glass which has not been subjected to a strengthening treatment and a mirror constant A thereof. The mirror constant A tends to decrease with increase in fictive temperature of the glass which has not been subjected to the strengthening treatment. Fracture of a glass proceeds in a part where the tensile stress is highest of the glass. The part where the tensile stress is highest is a central portion in the direction of the sheet thickness t of the glass. Therefore, the mirror constant of the central portion in the direction of the sheet thickness t of the glass is a factor of fracture of the glass as a whole.

In the present description, the central portion in the direction of the sheet thickness t of the glass has the following meaning. Assume that t designates a distance from one main surface of a glass sheet to the other main surface in a normal direction. Define the normal direction as a t direction. The central portion in the sheet thickness t direction of the glass is at a position of t/2 from each main surface in the t direction. Normally, when the two main surfaces of the glass sheet are strengthened in the same manner, the tensile stress is highest at the position of t/2 from each main surface in the t direction. Therefore, the value of the tensile stress in that part is an important value determining the characteristic of fracture.

The fictive temperature of the glass which has been subjected to a strengthening treatment, particularly the fictive temperature of the central portion in the sheet thickness t direction is affected by the fictive temperature of the glass before the strengthening treatment yet. When the strengthening treatment is performed on proper conditions, there arises no substantial difference particularly in the fictive temperature of the central portion in the sheet thickness t direction between before and after the strengthening treatment.

In the strengthened glass according to the present invention, in order to set the mirror constant A of the glass to 1.97 MPa·m$^{0.5}$ or less, it is preferable that the fictive temperature of the central portion in the sheet thickness t direction of the glass is not lower than a glass transition temperature Tg of the glass.

In the strengthened glass according to the present invention, the fictive temperature of the central portion in the sheet thickness t direction of the glass is more preferably Tg+20° C. or higher, even more preferably Tg+40° C. or higher, particularly preferably Tg+60° C. or higher, and most preferably Tg+80° C. or higher.

In the strengthened glass according to the present invention, it is preferable that the fictive temperature of the central portion in the sheet thickness t direction of the glass is Tg+100° C. or lower. When the fictive temperature is Tg+100° C. or lower, cracking is hardly caused by thermal strain, so that small crushed pieces can be obtained when the glass is crushed. The fictive temperature of the central portion in the sheet thickness t direction of the glass is more preferably Tg+90° C. or lower.

A fictive temperature $T_f$ in the present invention designates a numerical value obtained by a refractive index method which is described below. The fictive temperature $T_f$ can be measured by polishing a glass section and measuring a refractive index n. The fictive temperature $T_f$ can be expressed as:

$$T_f = a \times n + b \qquad (1)$$

Here, a and b are intrinsic constants for each kind of glass.

Specifically, the fictive temperature $T_f$ can be obtained by the refractive index method as follows. First, i (i≥2) test pieces are prepared from a glass sample whose fictive temperature should be measured. The test pieces are retained at different cooling start temperatures until refractive indexes reach equilibrium, respectively. After that, each test piece is cooled at 1,000° C./min or higher. Here, when the cooling start temperature is lower than the glass transition temperature, sufficient long retention time is required. It is therefore preferable to set the cooling start temperature at a temperature higher than the glass transition temperature by 10° C. to 100° C. For the glass cooled on those conditions, a refractive index $n_d$ is measured at a specific wavelength (e.g. 587.6 nm which is a d-line of He lamp). For each cooling start temperature $T_i$, a refractive index $n_{di}$ of the glass cooled rapidly from the cooling start temperature is plotted, and the constants a and b in the expression (1) are determined by linear regression to create a calibration curve. Next, a refractive index $n_{ds}$ of a test piece cut and polished out of a glass whose fictive temperature $T_f$ should be measured is measured. Thus, the fictive temperature $T_f$ of the glass can be determined by use of the calibration curve.

The fictive temperature of the glass before the strengthening treatment can be adjusted in the following procedure.

When a strengthened glass is manufactured, glass raw materials having a predetermined composition are prepared, melted, and then formed into a sheet glass. A cooling temperature profile at the forming time is adjusted so that the fictive temperature of the glass can be adjusted. In order to make the fictive temperature of the glass higher, the cooling rate in the vicinity of a glass transition temperature (for example, between an annealing point and a strain point) is, for example, increased. Specifically, high fictive temperature can be achieved when the cooling rate is set at 200° C./min or higher.

Alternatively, the fictive temperature of the glass can be also adjusted by the following procedure.

Glass raw materials having a predetermined composition are prepared, melted, and then formed into a sheet glass by a known sheet-like glass forming method (such as a float process, a fusion process or a roll-out process). The temperature of the formed glass is increased to a predetermined cooling start temperature, and retained at the temperature. After that, the cooling rate is adjusted so that the fictive temperature of the glass can be adjusted. In order to make the fictive temperature of the glass lower, it will go well if the cooling start temperature is decreased. In this case, it is preferable that the cooling rate is higher so that the fictive temperature can be made closer to the cooling start temperature. The required retention time depends on the cooling start temperature. However, the retention time is preferably 500/(cooling start temperature–Tg) minutes or more, and more preferably 1,000/(cooling start temperature–Tg) minutes or more.

It is preferable to set the cooling start temperature at Tg+30° C. or higher. When the cooling start temperature is Tg+30° C. or higher, the fictive temperature can be increased so that the fictive temperature of the central portion in the sheet thickness t direction can be easily set at the glass transition temperature Tg or higher. The cooling start temperature is more preferably Tg+40° C. or higher, and even more preferably Tg+50° C. or higher.

On the other hand, it is preferable that the cooling start temperature is set at Tg+100° C. or lower. When the cooling start temperature is Tg+100° C. or lower, the fictive temperature can be decreased so that the fictive temperature of the central portion in the sheet thickness t direction can be easily set at Tg+100° C. or lower. The cooling start temperature is more preferably Tg+60° C. or lower, even more preferably Tg+30° C. or lower, and particularly preferably Tg+20° C. or lower.

When the fictive temperature is adjusted by this procedure, it is preferable that the cooling rate is set at 100° C./min or higher. The cooling rate is more preferably 200° C./min or higher, and even more preferably 300° C./min or higher.

A strengthening treatment is applied to the cooled glass on predetermined conditions. In a case of air-cooling tempering, the glass is put into a heating furnace at Tg+60° C. to Tg+100° C. (for example, for 7 minutes or more), and cooled (for example, at an equivalent cooling rate of 500° C./min or higher). Thus, there arises no substantial difference in the fictive temperature of the central portion in the sheet thickness t direction before and after the strengthening treatment.

In the strengthened glass according to the present invention, it is preferable that the central portion in the sheet thickness t direction has a higher tensile stress CT to increase the crushed piece density so that crushed pieces can be made small and granular when the glass is cracked.

In the strengthened glass according to the present invention, the tensile stress CT of the central portion in the sheet thickness t direction is preferably 5 MPa or more, more preferably 10 MPa or more, even more preferably 20 MPa or more, and further more preferably 30 MPa or more.

The upper limit of the tensile stress CT of the central portion in the sheet thickness t direction is not particularly limited. Practically, however, the tensile stress CT is 1,000 MPa or less, and 200 MPa or less in the case of an air-cooled tempered glass.

As described above, as the mirror constant A of the glass is smaller, the crushed piece density is higher, so that crushed pieces can be made small and granular when the glass is cracked. On the other hand, as the tensile stress CT of the central portion in the sheet thickness t direction is higher, the crushed piece density is higher, so that crushed pieces can be made small and granular when the glass is cracked.

Therefore, as a quotient (CT/A) of the tensile stress CT of the central portion in the sheet thickness t direction and the mirror constant A is larger, the crushed piece density is higher, so that crushed pieces can be made small and granular when the glass is cracked.

In the strengthened glass according to the present invention, the quotient (CT/A) of the tensile stress CT (unit: MPa) of the central portion in the sheet thickness t direction and the mirror constant A (unit: MPa·m$^{0.5}$) is preferably 2.5 m$^{-0.5}$ or more, more preferably 3 m$^{-0.5}$ or more, even more preferably 5 m$^{-0.5}$ or more, and particularly preferably 8 m$^{-0.5}$ or more. The upper limit of the CT/A is not particularly limited, but it is preferably 1,000 m$^{-0.5}$ or less, and more preferably 500 m$^{-0.5}$ or less.

When a strengthened glass has a large depth of compressive stress layer DOL, a tip of a scratch can stay in a compressive stress layer if the scratch is deep. Therefore, the strengthened glass is hardly destroyed.

In the strengthened glass according to the present invention, it is preferable that the depth of compressive stress layer DOL is (1/10)×t mm or more when the sheet thickness is t (unit: mm). The DOL prevents propagation of scratches existing in the glass surface. In order to enhance the strength of the glass, it is necessary to make the DOL deeper than the depth of the scratches. Therefore, the DOL is more preferably (1/9)×t mm or more, and even more preferably (1/8)×t mm or more. On the other hand, the DOL is preferably (1/3)×t mm or less. The DOL is more preferably (1/3.5)×t mm or less, and even more preferably (1/4)×t mm or less.

When a strengthened glass has a large DOL, a tip of a scratch can stay in a compressive stress layer if the scratch is deep. Therefore, the strengthened glass is hardly destroyed.

In the strengthened glass according to the present invention, the depth of compressive stress layer DOL is 0.150 mm or more, more preferably 0.200 mm or more, and even more preferably 0.300 mm or more. On the other hand, the depth of compressive stress layer DOL is preferably 10 mm or less, more preferably 8 mm or less, even more preferably 6 mm or less, further more preferably 5 mm or less, particularly preferably 4.5 mm or less, and most preferably 4 mm or less.

Since the strengthened glass according to the present invention is used as a window glass for an automobile, it is preferable that the sheet thickness t is 1.2 mm or more. The sheet thickness t is more preferably 1.5 mm or more, even more preferably 1.8 mm or more, further more preferably 2.0 mm or more, further more preferably 2.2 mm or more, further more preferably 2.5 mm or more, particularly preferably 3.0 mm or more, and most preferably 3.5 mm or more. On the other hand, the sheet thickness t is preferably 50 mm or less. When the sheet thickness t is 50 mm or less, the weight can be reduced. The sheet thickness t is more preferably 45 mm or less, even more preferably 40 mm or less, further more preferably 35 mm or less, further more preferably 30 mm or less, further more preferably 25 mm or less, further more preferably 20 mm or less, further more preferably 10 mm or less, particularly preferably 5 mm or less, and most preferably 4 mm or less.

The present inventor obtained the following knowledge as to the relationship between the mirror constant A of a glass and the physical properties of the glass or the composition of the glass.

In Case of Glass Composition Substantially Not-Containing $B_2O_3$ (1) As a Poisson's ratio ν of a glass is higher, a mirror constant A of the glass is smaller. The reason is considered as follows. A higher Poisson's ratio ν of a glass indicates that the glass is rich in non-bridging oxygen, and many weak bonds are present among elements constituting the glass. Therefore, a fracture surface can be formed easily.

It is therefore preferable that the Poisson's ratio ν of the glass is high. Specifically, the Poisson's ratio ν of the glass is preferably 0.18 or higher, more preferably 0.20 or higher, and even more preferably 0.21 or higher. Although the upper limit of the Poisson's ratio ν is not particularly limited, it may be 0.27 or lower.

The Poisson's ratio ν of the glass can be increased in the following method.

When a ratio of elements forming a network, such as $SiO_2$, $Al_2O_3$, $P_2O_5$, etc., is lower in the glass, bonds rich in non-bridging oxygen are increased to increase the density and increase the Poisson's ratio ν.

The Poisson's ratio ν is higher in a glass whose packing density (a ratio of the sum of ionic radii of elements constituting the glass to the total volume of the glass) is higher. This corresponds to increase of weak bonds among the elements constituting the glass, that is, increase of a ratio of network modifiers. According to another method, the Poisson's ratio ν can be increased by selecting elements rich in flat surface structure, such as sulfates, in a network structure.

Here, substantially not-containing $B_2O_3$ means that $B_2O_3$ is not contained excluding the case that $B_2O_3$ is mixed as unavoidable impurity (the same is applied below in the present description).

(2) As the glass has a lower Young's modulus E, the mirror constant A of the glass can be reduced. It is therefore preferable that the Young's modulus E of the glass is low. Specifically, the Young's modulus E of the glass is preferably 100 GPa or less, more preferably 90 GPa or less, and even more preferably 80 GPa or less.

On the other hand, in terms of easiness to insert a stress during the strengthening treatment, the Young's modulus E of the glass is preferably 55 GPa or more, more preferably 60 GPa or more, and even more preferably 65 GPa or more.

When attention is paid to the Young's modulus E of the glass, it is preferable that $Al_2O_3$ which tends to repair the cut network structure to thereby increase the Young's modulus E is not contained excessively. When the glass is rich in $SiO_2$, the network structure of the glass becomes comparatively firm. Thus, the Young's modulus E becomes too high. It is therefore preferable that $SiO_2$ is not added excessively.

(3) In the case of a glass composition substantially not-containing $B_2O_5$, the mirror constant A is increased when the dosage of alkali-earth metal oxides RO is increased. It is therefore preferable that the dosage of alkali-earth metal oxides RO is reduced. Here, the alkali-earth metal oxides RO designate MgO, CaO, SrO and BaO collectively (the same is applied below in the present description).

Although not affecting the mirror constant A of the glass, $P_2O_5$ tends to produce phase separation or devitrification species. It is therefore preferable that much $P_2O_5$ is not added into the glass.

Based on the aforementioned knowledge, it is preferable that as a glass composition represented by mole percentage based on oxides, 40 to 85% of $SiO_2$, 0 to 15% of $Al_2O_3$, 0 to 5% of $P_2O_5$, 8 to 40% of alkali metal oxides ($R_2O$) in total, and 0 to 20% of alkali-earth metal oxides (RO) in total are contained, and $B_2O_3$ is substantially not contained. Here, the alkali metal oxides ($R_2O$) designate $Li_2O$, $Na_2O$, $K_2O$ and $Rb_2O$ collectively (the same is applied below in the present description).

It is more preferable that as a glass composition represented by mole percentage based on oxides, 40 to 80% of $SiO_2$, 0 to 5% of $Al_2O_3$, 0 to 5% of $P_2O_5$, 8 to 40% of alkali metal oxides ($R_2O$) in total, and 0 to 20% of alkali-earth metal oxides (RO) in total are contained, and $B_2O_3$ is substantially not contained.

It is even more preferable that as a glass composition represented by mole percentage based on oxides, 50 to 80% of $SiO_2$, 0.1 to 5% of $Al_2O_3$, 0 to 3% of $P_2O_5$, 10 to 35% of alkali metal oxides ($R_2O$) in total, and 0.1 to 15% of alkali-earth metal oxides (RO) in total are contained, and $B_2O_3$ is substantially not contained.

It is particularly preferable that as a glass composition represented by mole percentage based on oxides, 65 to 78% of $SiO_2$, 0.2 to 5% of $Al_2O_3$, 0 to 1% of $P_2O_5$, 15 to 25% of alkali metal oxides ($R_2O$) in total, and 0.1 to 8% of alkali-earth metal oxides (RO) in total are contained, and $B_2O_3$ is substantially not contained.

Description is made below about each component in the case of the glass composition substantially not-containing $B_2O_3$.

$SiO_2$ is a principal component of the glass.

When the content of $SiO_2$ is 40% or higher, the weather resistance is improved. The content of $SiO_2$ is preferably 40% or higher, more preferably 50% or higher, and even more preferably 65% or higher. When the content of $SiO_2$ is 85% or lower, the glass is resistant to devitrification. The content of $SiO_2$ is more preferably 80% or lower, even more preferably 78% or lower, and particularly preferably 75% or lower.

$Al_2O_3$ is a component improving the weather resistance. The content of $Al_2O_3$ is 0% or higher. When $Al_2O_3$ is contained, the weather resistance of the glass is improved. The content of $Al_2O_3$ is more preferably 0.1% or higher, even more preferably 0.2% or higher, and particularly preferably 0.5% or higher. When the content of $Al_2O_3$ is 15% or lower, the meltability is excellent. In addition, the mirror constant also tends to be reduced. The content of $Al_2O_3$ is more preferably 10% or lower, even more preferably 8% or lower, and particularly preferably 5% or lower.

When the ratio ($Al_2O_3/SiO_2$) of $Al_2O_3$ to $SiO_2$ is 0 or higher, the number of bonds increases so that the structure becomes firm enough to be handled easily as a glass. The $Al_2O_3/SiO_2$ is more preferably 0.005 or higher, and even more preferably 0.01 or higher. However, when the ratio ($Al_2O_3/SiO_2$) of $Al_2O_3$ to $SiO_2$ is high, the mirror constant increases. It is therefore preferable that the $Al_2O_3/SiO_2$ is 0.6 or lower. The $Al_2O_3/SiO_2$ is more preferably 0.5 or lower, even more preferably 0.3 or lower, and particularly preferably 0.2 or lower.

$P_2O_5$ tends to produce phase separation or devitrification species. It is therefore preferable that $P_2O_5$ is substantially not contained. However, 5% or lower of $P_2O_5$ may be contained to increase the depth of compressive stress layer DOL. The content of $P_2O_5$ may be 3% or lower, or 1% or lower.

When the total content of alkali metal oxides ($R_2O$) is 8% or higher, the viscosity of the glass tends to be reduced in the case where the temperature of the glass is increased to be high. Thus, the glass can be melted easily. The total content of $R_2O$ is more preferably 10% or higher, and even more preferably 15% or higher. On the other hand, when the total content of $R_2O$ is 40% or lower, the mirror constant is reduced. The total content of $R_2O$ is more preferably 35% or lower, even more preferably 30% or lower, and particularly preferably 20% or lower.

$Li_2O$ has an effect of reducing the viscosity of the glass at the time of high temperature. However, as compared with the other alkali metal oxides, $Li_2O$ tends to increase the Young's modulus to increase the mirror constant. Therefore, the content of $Li_2O$ is more preferably 30% or lower, and even more preferably 25% or lower. However, in a case where the $SiO_2$ content is low, the mirror constant can be prevented from increasing even if the Young's modulus increases due to the increase of $Li_2O$. It is therefore preferable that 5% or more of $Li_2O$ is contained. The content of $Li_2O$ is more preferably 10% or higher, and even more preferably 20% or higher. In consideration thereof, $SiO_2 \pm Li_2O$ is preferably 65% or higher, more preferably 70% or higher, and even more preferably 75% or higher.

$Na_2O$ is a component having an effect of reducing the viscosity of the glass at the time of high temperature in the same manner as $Li_2O$. When the content of $Na_2O$ is 5% or higher, the aforementioned effect can be attained. The content of $Na_2O$ is more preferably 10% or higher, and even more preferably 15% or higher. When the content of $Na_2O$ is 40% or lower, the network in the glass structure can be maintained. The content of $Na_2O$ is more preferably 30% or lower, and even more preferably 20% or lower.

$K_2O$ is a component having an effect of reducing the viscosity of the glass at the time of high temperature in the same manner as $Li_2O$ or $Na_2O$. When the content of $K_2O$ is 2% or higher, the effect of reducing the viscosity can be enhanced. The content of $K_2O$ is more preferably 3% or higher, and even more preferably 5% or higher. When the content of $K_2O$ is 20% or lower, the deliquescency of the glass can be reduced to some extent. The content of $K_2O$ is more preferably 10% or lower, and even more preferably 8% or lower.

$Rb_2O$ is a component having an effect of reducing the viscosity of the glass at the time of high temperature in the same manner as $Li_2O$, $Na_2O$ or $K_2O$. When the content of $Rb_2O$ is 1% or higher, the effect of absorbing energy when the glass is destroyed can be enhanced due to a mixed alkali effect. The content of $Rb_2O$ is more preferably 2% or higher, and even more preferably 3% or higher. When the content of $Rb_2O$ is 10% or lower, the weight of the glass can be prevented from excessively increasing. The content of $Rb_2O$ is more preferably 5% or lower, and even more preferably 4% or lower.

The alkali-earth metal oxides (RO) are not essential, but may be contained to improve the meltability. When the total content of RO is 0% or higher, the meltability is improved. The total content of RO may be 0.1% or higher, or 0.2% or higher. On the other hand, when the total content of RO is 15% or lower, the mirror constant does not increase on a large scale, so that expansion of the glass can be prevented from varying largely. It is therefore preferable that the total content of RO is 15% or lower. The total content of RO is more preferably 10% or lower, even more preferably 8% or lower, and particularly preferably 5% or lower.

MgO is not essential, but is characterized by increasing the hardness of the glass without increasing the expansion while keeping the density low, in spite of alkali-earth metal oxide. Accordingly, MgO may be contained to improve the meltability. Therefore, the content of MgO is more preferably 0.1% or higher, and even more preferably 0.2% or higher. When the content of MgO is 10% or lower, the mirror constant is not too large. The content of MgO is more preferably 8% or lower, and even more preferably 5% or lower.

CaO is a component improving the meltability at high temperature or preventing devitrification from easily occurring. When the content of CaO is 0.1% or higher, devitrification can be prevented. The content of CaO is more preferably 0.2% or higher. When the content of CaO is 10% or lower, both the effect of improving the meltability and the effect of increasing the Young's modulus of the glass can be obtained. The content of CaO is more preferably 8% or lower, and even more preferably 5% or lower.

SrO is a component improving the meltability at high temperature or preventing devitrification from easily occurring. When the content of SrO is 0.1% or higher, devitrification can be prevented effectively. The content of SrO is more preferably 0.2% or higher, and even more preferably 0.3% or higher. When the content of SrO is 10% or lower, there arises no problem as to increase in weight of the glass. The content of SrO is more preferably 8% or lower, and even more preferably 5% or lower.

BaO is a component improving the meltability at high temperature or preventing devitrification from easily occurring. When the content of BaO is 0.1% or higher, energy dissipation tends to occur due to the alkali-earth mixing effect. The content of BaO is more preferably 0.2% or higher, and even more preferably 0.3% or higher. When the content of BaO is 10% or lower, there arises no problem as to increase in weight of the glass. The content of BaO is more preferably 8% or lower, and even more preferably 5% or lower.

Based on the aforementioned knowledge, it is preferable that G expressed by the following expression (4) is −0.33 or less when $B_2O_3$ is substantially not contained in the strengthened glass according to the present invention.

$$G=E\times 0.013+v\times(-6.6)+[Al_2O_3]\times 0.023+\Sigma RO\times 0.013 \qquad (4)$$

In the expression, E designates the Young's modulus (GPa) of the glass, v designates the Poisson's ratio of the glass, $[Al_2O_3]$ designates the content of $Al_2O_3$ (mole percentage based on oxides) in the glass, and $\Sigma RO$ designates the total content of alkali-earth metal oxides (mole percentage based on oxides) in the glass.

When G is −0.33 or less, the mirror constant tends to be reduced. G is more preferably −0.35 or less, even more preferably −0.4 or less, and particularly preferably −0.45 or less. The lower limit of G is not particularly limited. However, a glass whose Young's modulus is too low cannot be easily used. It is therefore preferable that G is −0.7 or more.

In addition, based on the aforementioned knowledge, it is preferable that I expressed by the following expression (6) is 0.30 or less when $B_2O_3$ is substantially not contained in the strengthened glass according to the present invention.

$$I=[Al_2O_3]\times 0.03+\Sigma RO\times 0.014 \qquad (6)$$

In the expression, $[Al_2O_3]$ designates the content of $Al_2O_3$ (mole percentage based on oxides) in the glass, and $\Sigma RO$ designates the total content of alkali-earth metal oxides (mole percentage based on oxides) in the glass.

When I is 0.30 or less, the mirror constant tends to be reduced. I is more preferably 0.28 or less, even more preferably 0.25 or less, and particularly preferably 0.20 or less. The lower limit of I is not particularly limited. However, it is preferable that I is 0.05 or more in order to maintain the structure of the glass.

In Case of Glass Composition Containing $B_2O_3$ (1) When fracture occurs in a glass, each crack grows in the glass. A stress increases at the tip of the crack. This leads to new propagation of the crack. On the other hand, in a glass containing 3-coordinate boron, the 3-coordinate boron is arranged as 4-coordinate boron due to the stress. Fracture energy is consumed by the change in coordination number. Due to the energy consumption, energy to be distributed to the propagation of the crack is reduced. As a result, formation of a fracture surface is reduced. When the formation of a fracture surface is reduced, a mirror surface lasts long so that the mirror surface cannot become a mist surface easily. Thus, the glass is a glass having a large mirror constant. That is, as the content of 3-coordinate boron in the glass is reduced, the mirror constant A of the glass is reduced. Thus, it is preferable.

On the other hand, the content of 4-coordinate boron hardly affects the mirror constant A of the glass. Therefore, the content of 4-coordinate boron may be increased. However, when alkali metal oxides ($R_2O$) are added excessively in order to increase the content of 4-coordinate boron, the rigidity of the glass cannot be maintained. It is therefore preferable that alkali metal oxides ($R_2O$) are not added excessively.

In order to increase the content of 4-coordinate boron, the following components may be added to the glass.

In the case of a glass composition containing $B_2O_3$, alkali metal oxides ($R_2O$) and alkali-earth metal oxides (RO) tend to arrange boron in the glass as 4-coordinate boron without changing the rigidity of the glass largely as a whole. It is therefore preferable to increase the content of alkali metal oxides ($R_2O$) and alkali-earth metal oxides (RO).

In the case of a glass composition containing $B_2O_3$, it is preferable to add $Al_2O_3$ to reduce the mirror constant of the glass largely.

(2) As the Young's modulus E of the glass is lower, the mirror constant A of the glass can be reduced. Specifically, the Young's modulus of the glass is preferably 100 GPa or less, more preferably 90 GPa or less, and even more preferably 80 GPa or less. On the other hand, in order to easily insert a stress during the strengthening treatment, the Young's modulus E of the glass is preferably 55 GPa or more, more preferably 60 GPa or more, and even more preferably 65 GPa or more. Components giving influence to the Young's modulus E of the glass are the same as in the case of the glass component substantially not-containing $B_2O_3$.

Although not affecting the mirror constant A of the glass, $P_2O_5$ tends to produce phase separation or devitrification species. It is therefore preferable that much $P_2O_5$ is not added into the glass.

Based on the aforementioned knowledge, it is preferable that as a glass composition represented by mole percentage based on oxides, 40 to 85% of $SiO_2$, 0.1 to 20% of $B_2O_3$, 0 to 5% of $P_2O_5$, 5 to 40% of alkali metal oxides ($R_2O$) in total, and 0 to 15% of alkali-earth metal oxides (RO) in total are contained.

It is more preferable that as a glass composition represented by mole percentage based on oxides, 65 to 85% of $SiO_2$, 0.1 to 10% of $B_2O_3$, 0 to 5% of $P_2O_5$, 10 to 20% of alkali metal oxides ($R_2O$) in total, and 5 to 15% of alkali-earth metal oxides (RO) in total are contained.

It is even more preferable that as a glass composition represented by mole percentage based on oxides, 65 to 85% of $SiO_2$, 1 to 15% of $Al_2O_3$, 0.1 to 10% of $B_2O_3$, 0 to 5% of $P_2O_5$, 10 to 20% of alkali metal oxides ($R_2O$) in total, and 5 to 15% of alkali-earth metal oxides (RO) in total are contained.

It is particularly more preferable that as a glass composition represented by mole percentage based on oxides, 50 to 80% of $SiO_2$, 3 to 15% of $Al_2O_3$, 1 to 15% of $B_2O_3$, 0 to 5% of $P_2O_5$, 10 to 35% of alkali metal oxides ($R_2O$) in total, and 0.1 to 8% of alkali-earth metal oxides (RO) in total are contained.

Description is made below about each component in the case of the glass composition containing $B_2O_3$.

$SiO_2$ is a principal component of the glass.

When the content of $SiO_2$ is 40% or higher, the weather resistance is improved. The content of $SiO_2$ is more preferably 50% or higher, and even more preferably 65% or higher, and particularly preferably 72% or higher. When the content of $SiO_2$ is 85% or lower, the glass is resistant to devitrification. The content of $SiO_2$ is more preferably 80% or lower, even more preferably 78% or lower, and particularly preferably 75% or lower.

$Al_2O_3$ is a component improving the weather resistance. In addition, in a case of a glass containing $B_2O_3$, $Al_2O_3$ can reduce the mirror constant. It is therefore preferable that $Al_2O_3$ is contained. The content of $Al_2O_3$ is more preferably 1% or higher, even more preferably 3% or higher, and particularly preferably 5% or higher. When the content of $Al_2O_3$ is 20% or lower, the meltability is improved. The content of $Al_2O_3$ is more preferably 15% or lower, even more preferably 13% or lower, and particularly preferably 12% or lower.

When the ratio ($Al_2O_3/SiO_2$) of $Al_2O_3$ to $SiO_2$ is 0.01 or higher, the network can be stabilized. The $Al_2O_3/SiO_2$ is more preferably 0.02 or higher, and even more preferably 0.1 or higher. When the ratio ($Al_2O_3/SiO_2$) of $Al_2O_3$ to $SiO_2$ is 1 or lower, the meltability is excellent. The $Al_2O_3/SiO_2$ is more preferably 0.7 or lower, and even more preferably 0.6 or lower.

$P_2O_5$ tends to produce phase separation or devitrification species. It is therefore preferable that $P_2O_5$ is substantially not contained. However, 5% or lower of $P_2O_5$ may be contained to increase the thickness of a compressive stress layer when the glass is used as a chemically strengthened glass. The content of $P_2O_5$ may be 4% or lower, or 3% or lower.

$B_2O_3$ has an effect of reducing scratchability of the glass when the content of $B_2O_3$ is 0.1% or higher. From this, the content of $B_2O_3$ is preferably 1% or higher, and more preferably 5% or higher. When the content of $B_2O_3$ is 20% or lower, volatilization during melting can be prevented. The content of $B_2O_3$ is more preferably 15% or lower, and even more preferably 13% or lower.

When the ratio ($B_2O_3/\Sigma R_2O$) of $B_2O_3$ of the sum of $R_2O$ is low, the number of 4-coordinate boron is increased so that the mirror constant tends to be reduced. It is therefore preferable that the $B_2O_3/\Sigma R_2O$ is 1 or lower. The $B_2O_3/\Sigma R_2O$ is more preferably 0.8 or lower, and even more preferably 0.6 or lower. However, when alkali metal is more than $B_2O_3$ which is a network former, the structure of the glass itself becomes unstable. It is therefore preferable that the $B_2O_3/R_2O$ is 0.1 or higher. The $B_2O_3/\Sigma R_2O$ is more preferably 0.3 or higher, and even more preferably 0.5 or higher.

When the total content of alkali metal oxides ($R_2O$) is 5% or higher, the viscosity of the glass tends to be reduced in a case where the temperature of the glass is increased to be high. Thus, the glass can have high meltability. The total content of $R_2O$ is more preferably 8% or higher, even more preferably 10% or higher, and particularly preferably 12% or higher. On the other hand, when the total content of $R_2O$ is 40% or lower, the Young's modulus can be prevented from suddenly decreasing. The total content of $R_2O$ is more preferably 35% or lower, and even more preferably 30% or lower.

$Li_2O$ is an alkali metal oxide component which has an effect of reducing the viscosity of the glass at the time of high temperature without causing reduction in Young's modulus at a room temperature. When the content of $Li_2O$ is 0% or higher, the aforementioned effect appears. The content of $Li_2O$ is more preferably 2% or higher, and even more preferably 4% or higher. When the content of $Li_2O$ is 20% or lower, the network in the glass structure can be maintained. In addition, increase in price of an obtained glass can be avoided since $Li_2O$ is expensive. The content of $Li_2O$ is more preferably 18% or lower, and even more preferably 16% or lower.

$Na_2O$ is a component having an effect of reducing the viscosity of the glass at the time of high temperature in the same manner as $Li_2O$. In addition, $Na_2O$ has an effect of cutting the network to thereby reduce the mirror constant. When the content of $Na_2O$ is 5% or higher, the aforementioned effect can be attained. The content of $Na_2O$ is more preferably 10% or higher, and even more preferably 12% or higher. When the content of $Na_2O$ is 40% or lower, the network in the glass structure can be maintained. The content of $Na_2O$ is more preferably 35% or lower, and even more preferably 30% or lower.

$K_2O$ is a component having an effect of reducing the viscosity of the glass at the time of high temperature in the same manner as $Li_2O$ or $Na_2O$. In addition, $K_2O$ has an effect of cutting the network to thereby reduce the mirror constant. When the content of $K_2O$ is 2% or higher, the effect of reducing the viscosity can be enhanced. The content of $K_2O$ is more preferably 3% or higher, and even more preferably 5% or higher. When the content of $K_2O$ is 20% or lower, the deliquescency of the glass can be reduced to some extent. The content of $K_2O$ is more preferably 15% or lower, and even more preferably 10% or lower.

$Rb_2O$ is a component having an effect of reducing the viscosity of the glass at the time of high temperature in the same manner as $Li_2O$, $Na_2O$ or $K_2O$. In addition, $Rb_2O$ has an effect of cutting the network to thereby reduce the mirror constant. When the content of $Rb_2O$ is 1% or higher, the effect can be enhanced. The content of $Rb_2O$ is more preferably 0.1% or higher, and even more preferably 0.2% or higher. When the content of $Rb_2O$ is 10% or lower, the weight of the glass can be prevented from excessively increasing. The content of $Rb_2O$ is more preferably 5% or lower, and even more preferably 4% or lower.

The alkali-earth metal oxides (RO) may be contained to improve the meltability. When the total content of RO is 0.1% or higher, the viscosity of the glass at high temperature is reduced so that the glass can be melted easily. The total content of RO may be 0.2% or higher. However, RO is a component increasing the mirror constant. Therefore, the total content of RO is preferably 15% or lower, more preferably 10% or lower, and even more preferably 8% or lower.

MgO is a component which tends to make the network of the glass firm to increase the Young's modulus. Therefore, MgO is a component increasing the mirror constant. It is preferable that the content of MgO is lower. The content of MgO is preferably 10% or lower, and more preferably 8% or lower, and even more preferably 7% or lower. On the other hand, the weather resistance of the glass can be improved by MgO. It is therefore preferable that 0.1% or higher of MgO is contained. The content of MgO is more preferably 0.2% or higher, and even more preferably 0.5% or higher.

CaO has an effect of improving the meltability at high temperature and improving the chemical resistance. The content of CaO is preferably 0.1% or higher, and more preferably 0.2% or higher. When CaO is too much, there is a fear that the devitrification temperature increases, or much phosphor which is an impurity in limestone ($CaCO_3$) serving as a CaO raw material may be mixed. It is therefore preferable that the content of CaO is 10% or lower. The content of CaO is more preferably 8% or lower, and even more preferably 5% or lower.

SrO is a component improving the meltability at high temperature or preventing devitrification from easily occurring. When the content of SrO is 0.1% or higher, devitrification can be prevented effectively. The content of SrO is more preferably 0.2% or higher. When the content of SrO is 10% or lower, there arises no problem as to increase in weight of the glass. The content of SrO is more preferably 8% or lower, and even more preferably 5% or lower.

BaO is a component improving the meltability at high temperature or preventing devitrification from easily occurring. When the content of BaO is 0.1% or higher, energy dissipation tends to occur due to the alkali-earth mixing effect. The content of BaO is more preferably 0.2% or higher. However, of the alkali-earth metal oxides, BaO is most effective in reducing the ion exchange rate. It is therefore preferable that the content of BaO is 5% or lower when the method for strengthening the glass is a chemically strengthening method. The content of BaO is more preferably 3% or lower, and even more preferably 1% or lower.

Based on the aforementioned knowledge, it is preferable that H expressed by the following expression (5) is 0.30 or less when $B_2O_3$ is contained in the strengthened glass according to the present invention.

$$H=B_2O_3(\text{3-coordinate})\times 0.039+E\times 0.036+\Sigma RO\times(-0.030)-2.3 \quad (5)$$

In the expression, $B_2O_3$(3-coordinate) designates the content of 3-coordinate boron (mole percentage based on oxides) in the glass, E designate the Young's modulus (GPa) of the glass, and $\Sigma RO$ designates the total content of alkali-earth metal oxides (mole percentage based on oxides) in the glass.

When H is 0.30 or less, the mirror constant tends to be reduced. H is more preferably 0.28 or less, even more preferably 0.25 or less, and particularly preferably 0.20 or less. The lower limit of H is not particularly limited. However, a glass whose Young's modulus is too low is limited as to its application. It is therefore preferable that H is −0.5 or more.

Based on the aforementioned knowledge, it is preferable that J expressed by the following expression (7) is 0.33 or less when $B_2O_3$ is contained in the strengthened glass according to the present invention.

$$J=[B_2O_3]\times 0.031-0.026\times[K_2O] \quad (7)$$

In the expression, $[B_2O_3]$ designates the content of $B_2O_3$ (mole percentage based on oxides) in the glass, and $[K_2O]$ designates the content of $K_2O$ (mole percentage based on oxides) in the glass.

When J is 0.33 or less, the mirror constant tends to be reduced. J is more preferably 0.31 or less, and even more preferably 0.25 or less. The lower limit of J is not particularly limited. However, when the content of alkali metal oxides increases relatively to the content of $B_2O_3$, the network of the glass is cut so that the glass itself is not stable. It is preferable that J is −0.4 or more.

When CaO is used as alkali-earth metal oxide RO, the Young's modulus tends to increase. The increase of the Young's modulus leads to increase of the mirror constant A. It is therefore preferable that CaO is increased slightly enough not to increase the Young's modulus.

As for the alkali metal oxides $R_2O$, when alkali metal oxide $R_2O$ in which the atomic weight of alkali metal is larger is added, the network structure of the glass is cut so that a fracture surface can be formed easily. Therefore, the mirror constant A tends to be reduced. Therefore, as alkali metal oxide $R_2O$ to be added to the glass, $Na_2O$ is more preferable than $Li_2O$, and $K_2O$ is further more preferable. This tendency is conspicuous in a glass not containing $B_2O_3$.

In the strengthened glass according to the present invention, it is preferable that $<M_{R2O}>$ expressed by the following expression (8) is 10 or more.

$$<M_{R2O}>=\Sigma(Mi\times Ri)/\Sigma Ri \quad (8)$$

Here, Mi designates the atomic weight of alkali metal, Ri designates the content (mole percentage based on oxides) of alkali metal oxide contained in the glass, and $<M_{R2O}>$ designates a value correlated with the atomic weight of the alkali metal in the glass. It is suggested that as $<M_{R2O}>$ is smaller, the alkali metal oxide contained in the glass is a light element, and the network of the glass containing the alkali metal oxide which is a light element tends to be denser. Accordingly, the Young's modulus tends to increase, and the mirror constant increases. $<M_{R2O}>$ is more preferably 11 or more, and even more preferably 12 or more.

It is preferable that lanthanoids are substantially not contained in the strengthened glass according to the present invention. Here, the phrase "lanthanoids are substantially not contained" means that lanthanoids are not contained excluding the case that lanthanoids are mixed as unavoidable impurities. Since lanthanoids are substantially not contained, the glass can be set to be light in weight. In addition, light storage or emission can be avoided when sunlight falls on the glass.

It is preferable that F is substantially not contained in the strengthened glass according to the present invention. Here, the phrase "F is substantially not contained" means that F is not contained excluding the case that F is mixed as unavoidable impurity. Since F is substantially not contained, the composition of the glass can be prevented from easily varying even if thermal treatment is applied to the glass.

The glass sheet according to the embodiment of the present invention may contain $SO_3$. $SO_3$ is mainly derived from salt cake ($Na_2SO_4$) used as a refining agent.

In the glass sheet according to the embodiment of the present invention, the content of $SO_3$ is preferably 0.001% to 0.2% as represented by mass % based on oxides. When the content of $SO_3$ is 0.001% or higher, the refining effect during melting of the glass is improved to reduce bubbles. The content of $SO_3$ is preferably 0.003% or higher, more preferably 0.01% or higher, and even more preferably 0.02% or higher. When the content of $SO_3$ is 0.2% or lower, the gaseous component of $SO_2$ hardly stays behind as bubbles in the glass. The content of $SO_3$ is preferably 0.1% or lower, more preferably 0.05% or lower, and even more preferably 0.03% or lower.

The glass sheet according to the embodiment of the present invention may contain $SnO_2$. $SnO_2$ functions as refining agent.

In the glass sheet according to the embodiment of the present invention, the content of $SnO_2$ is preferably 0 to 1% as represented by mass % based on oxides. When $SnO_2$ is contained, the refining effect during melting of the glass is improved to reduce bubbles. The content of $SnO_2$ may be 0.1% or higher, may be 0.2% or higher, or may be 0.3% or higher. On the other hand, when the content of $SnO_2$ is 1% or lower, the raw material cost can be reduced, and volatilization in a manufacturing line can be reduced. The content of $SnO_2$ is more preferably 0.7% or lower, even more preferably 0.5% or lower, and particularly preferably 0.4% or lower.

The glass sheet according to the embodiment of the present invention may contain coloring components such as $Fe_2O_3$, $TiO_2$, $CeO_2$, CoO, Se, $MnO_2$, MnO, $Cr_2O_3$, $V_2O_5$, NiO and $Er_2O_3$, or does not have to contain the coloring components. It is preferable that $MnO_2$, MnO, $Cr_2O_3$, $V_2O_5$, NiO or $Er_2O_3$ is substantially not contained in the glass sheet according to the embodiment of the present invention.

When the strengthened glass according to the present invention is an air-cooled tempered glass, it is preferable that the glass satisfies the following low temperature coefficient of thermal expansion $\alpha_{LT}$ and high temperature coefficient of thermal expansion $\alpha_{HT}$ from the viewpoint of easiness to be tempered by air-cooling.

In an air-cooling tempering treatment, a glass to be strengthened is heated to a temperature near the softening temperature or the yield temperature of the glass, and then a cooling medium is spraying to the surface of the glass to rapidly cool the glass. Thus, a residual stress is given to the glass.

The easiness to be tempered by air-cooling in the present description means that the residual stress can be given easily when the air-cooling tempering treatment is performed in the aforementioned procedure.

In the present description, an average coefficient of thermal expansion at 50 to 350° C. is used as the low temperature coefficient of thermal expansion $\alpha_{LT}$. In the strengthened glass according to the present invention, it is preferable that the low temperature coefficient of thermal expansion $\alpha_{LT}$ is $60\times10^{-7}\cdot K^{-1}$ or more, from the viewpoint of giving the residual stress.

In the strengthened glass according to the present invention, the low temperature coefficient of thermal expansion $\alpha_{LT}$ is more preferably $70\times10^{-7}\cdot K^{-1}$ or more, and even more preferably $80\times10^{-7}\cdot K^{-1}$ or more. The upper limit of the low temperature coefficient of thermal expansion $\alpha_{LT}$ is not particularly limited, but it may be $170\times10^{-7}$ $K^{-1}$ or less.

In the present description, a load of 10 g is applied to a sample having a diameter of 5 mm and a length of 20 mm, and a thermal expansion curve is obtained by measurement at a temperature rise rate of 5° C./min. A maximum value of a coefficient of thermal expansion between the glass transition temperature and the yield temperature in the obtained thermal expansion curve is used as the high temperature coefficient of thermal expansion $\alpha_{HT}$.

There is normally a correlation between the low temperature coefficient of thermal expansion $\alpha_{LT}$ and the high temperature coefficient of thermal expansion am. There is a tendency that when the low temperature coefficient of thermal expansion $\alpha_{LT}$ is large, the high temperature coefficient of thermal expansion $\alpha_{HT}$ is also large. A glass in which the low temperature coefficient of thermal expansion $\alpha_{LT}$ is a numerical value close to that of a conventional glass while the high temperature coefficient of thermal expansion $\alpha_{HT}$ is larger than that of the conventional glass can be formed by use of a conventional apparatus. Further, the glass can be formed into a glass to which a residual stress can be given easily when an air-cooling tempering treatment is performed thereon.

From this viewpoint, in the strengthened glass according to the present invention, the ratio $\alpha_{HT}/\alpha_{LT}$ of the high temperature coefficient of thermal expansion $\alpha_{HT}$ to the low temperature coefficient of thermal expansion $\alpha_{LT}$ is preferably 2.0 or higher, more preferably 2.5 or higher, even more preferably 3.0 or higher, further more preferably 3.5 or higher, further more preferably 4.0 or higher, further more preferably 4.5 or higher, further more preferably 5.0 or higher, particularly preferably 6.0 or higher, and most preferably 7.0 or higher.

The residual stress given to the glass by the air-cooling tempering treatment is determined by a product $\alpha_{LT}\times E$ of the low temperature coefficient of thermal expansion $\alpha_{LT}$ and the Young's modules E of the glass. Therefore, a glass having a larger value as $\alpha_{LT}\times E$ is preferred as an air-cooled tempered glass.

In the strengthened glass according to the present invention, the product $\alpha_{LT}\times E$ of the low temperature coefficient of thermal expansion $\alpha_{LT}$ and the Young's modules E is preferably $5.0\times10^5$ $Pa\cdot K^{-1}$ or more, more preferably $6.0\times10^5$ $Pa\cdot K^{-1}$ or more, and even more preferably $7.0\times10^5$ $Pa\cdot K^{-1}$ or more.

In the strengthened glass according to the present invention, it is preferable that the specific gravity is 2.0 or more. When the specific gravity is 2.0 or more, acoustic insulation can be improved. When the strengthened glass is used as a glass for an automobile, external sound is hardly propagated into the automobile. The specific gravity is more preferably 2.3 or more, and even more preferably 2.5 or more. On the other hand, the specific gravity is preferably 3.0 or less. When the specific gravity is 3.0 or less, the glass is light in weight. The specific gravity is more preferably 2.8 or less, and even more preferably 2.6 or less.

EXAMPLES

The present invention is further described below along Examples.

Examples 1 to 23 are working Examples, and Examples 24 to 31 are comparative Examples.

Glass raw materials were prepared suitably, heated and melted. After that, the raw materials were homogenized by refining, stirring or the like, and formed by a float process to obtain a glass sheet (sheet thickness of 2.3 mm). Compositions (mole percentage based on oxides) of glasses used in working Examples and comparative Examples are shown in Tables 1 to 3.

As for Examples 22 and 23 and Examples 26 to 31 containing $B_2O_3$, the content of 3-coordinate boron (B(3-coordinate) (mole percentage)) was specified by the following expression (9) or (9').

In case that the total content of alkali metal oxides ($\Sigma R_2O$) was higher than the content of $Al_2O_3$ ($\Sigma R_2O > [Al_2O_3]$):

$$[B(3\text{-coordinate})]=[B_2O_3]-([Na_2O]-[Al_2O_3]) \quad (9)$$

In the expression, [B(3-coordinate)] designates the content of 3-coordinate boron (mole percentage) in the glass, $[B_2O_3]$ designates the content of $B_2O_3$ (mole percentage based on oxides) in the glass, $[Al_2O_3]$ designates the content of $Al_2O_3$ (mole percentage based on oxides) in the glass, and $[Na_2O]$ designates the content of $Na_2O$ (mole percentage based on oxides) in the glass.

In case that the total content of alkali metal oxides ($\Sigma R_2O$) was not higher than the content of $Al_2O_3$ ($\Sigma R_2O \leq [Al_2O_3]$):

$$[B(3\text{-coordinate})]=[B_2O_3] \quad (9')$$

As for Examples 1 to 21 and Examples 24 and 25 not containing $B_2O_3$, I expressed by the following expression (6) was obtained.

$$I=[Al_2O_3]\times 0.03+\Sigma RO\times 0.014 \quad (6)$$

In the expression, $[Al_2O_3]$ designates the content of $Al_2O_3$ (mole percentage based on oxides) in the glass, and $\Sigma RO$ designates the total content of alkali-earth metal oxides (mole percentage based on oxides) in the glass.

As for Examples 22 and 23 and Examples 26 to 31 containing $B_2O_3$, J expressed by the following expression (7) was obtained.

$$J=[B_2O_3]\times 0.031-0.026\times[K_2O] \quad (7)$$

In the expression, $[B_2O_3]$ designates the content of $B_2O_3$ (mole percentage based on oxides) in the glass, and $[K_2O]$ designates the content of $K_2O$ (mole percentage based on oxides) in the glass.

<Specific Gravity>

The glass sheet obtained in the aforementioned procedure was processed into a cuboid. The lengths of long sides and short sides of the glass sheet were measured in an error of ±0.01 mm by a micrometer, and the weight of the glass sheet was measured in an error of ±0.02 g. Thus, the specific gravity was obtained.

<Young's Modulus E, and Poisson's Ratio ν>

The Young's modulus E and the Poisson's ratio ν of the glass sheet obtained in the aforementioned procedure were measured by an ultrasonic pulse method.

As for Examples 1 to 21 and Examples 24 and 25 not containing $B_2O_3$, G expressed by the following expression (4) was obtained.

$$G = E \times 0.013 + \nu \times (-6.6) + [Al_2O_3] \times 0.023 + \Sigma RO \times 0.013 \quad (4)$$

In the expression, E designate the Young's modulus (GPa) of the glass, ν designates the Poisson's ratio of the glass, $[Al_2O_3]$ designates the content of $Al_2O_3$ (mole percentage based on oxides) in the glass, and ΣRO designates the total content of alkali-earth metal oxides (mole percentage based on oxides) in the glass.

As for Examples 22 and 23 and Examples 26 to 31 containing $B_2O_3$, H expressed by the following expression (5) was obtained.

$$H = B_2O_3(\text{3-coordinate}) \times 0.039 + E \times 0.036 + \Sigma RO \times (-0.030) - 2.3 \quad (5)$$

In the expression, $B_2O_3$ (3-coordinate) designates the content of 3-coordinate boron (mole percentage based on oxides) in the glass, E designate the Young's modulus (GPa) of the glass, and ΣRO designates the total content of alkali-earth metal oxides (mole percentage based on oxides) in the glass.

<Low Temperature Coefficient of Thermal Expansion $\alpha_{LT}$, High Temperature Coefficient of Thermal Expansion $\alpha_{HT}$, Glass Transition Temperature Tg, and Yield Temperature>

The glass sheet obtained in the aforementioned procedure was processed to manufacture a glass rod having a diameter of 5 mm and a length of 20 mm. By use of a dilatometer (TD5010 SA made by Bruker AXS GmbH.), a load of 10 g was applied to the glass rod, and a linear expansion curve was measured at a temperature rise rate of 5° C./min. Thus, the glass transition temperature Tg (unit: ° C.), the yield temperature (unit: ° C.), the low temperature coefficient of thermal expansion $\alpha_{LT}$ (unit: $\times 10^{-7}$/° C.), and the high temperature coefficient of thermal expansion $\alpha_{HT}$ (unit: $\times 10^{-7}$/° C.) were obtained. Each value between parentheses in Tables 1 to 3 is a calculated value.

<Fictive Temperature>

The fictive temperature of the glass was measured in the following procedure.

First, out of each glass, glasses having different fictive temperatures were manufactured in the following procedure. Glass raw materials having a predetermined composition were prepared, melted, and then formed into sheet glasses. After the molding, the glasses were retained at cooling start temperatures in Table 2 and Table 3 respectively. After that, the cooling rate was adjusted to adjust the fictive temperature of each glass. Next, the fictive temperature of each glass was obtained as follows. For each of the glasses having different compositions, three sheet-like glasses were prepared. Each of the sheet-like glasses was suspended in a platinum crucible by use of a platinum wire and a ceramic rod so as not to touch the wall surface of the crucible. In this state, the sheet-like glasses were put into electric furnaces retained at different cooling start temperatures T (° C.) respectively. Here, the cooling start temperatures and the retention times were set at Tg+50° C. and 5 minutes, Tg+30° C. and 20 minutes, and Tg+10° C. and 2 hours, respectively. The sheet-like glasses were retained, and then taken out from the electric furnaces to the outside thereof at a room temperature of about 25° C. Thus, the glasses were cooled down at a cooling rate of 1,000° C./min or higher. Next, a refractive index $n_d$ in a d-line of each of the glasses was measured by use of a refractive index meter (KPR2000 made by Shimadzu Device Corporation). From the refractive indexes $n_d$ and the cooling start temperatures T, the constants a and b in the expression (1) were determined by linear regression. Next, as for a glass whose $T_f$ was not known, the refractive index $n_d$ was measured, and the fictive temperature $T_f$ was obtained by use of the relationship $T_f = a \times n_d + b$ in the expression (1).

<Mirror Constant>

Glass processing, scratching, a thermal treatment, a bending test, and observation of a fracture surface were performed in the following procedure. Thus, the mirror constant was measured.

(Processing)

The glass sheet obtained in the aforementioned procedure was processed into dimensions of 40 mm×6 mm×3 mm, and front and back surfaces and end surfaces (totally 4 surfaces) thereof were polished into mirror surfaces. Thus, 8 glass sheets were manufactured.

(Scratching)

By use of a Vickers hardness meter (HMV-2 made by Shimadzu Corporation), a diamond indenter having an angle of 110° between the opposite faces was pushed into the 8 glass sheets with different loads to thereby scratch the glass sheets. The pushing loads were set at 0.05 kgf, 0.1 kgf, 0.3 kgf, 0.5 kgf, 0.75 kgf, 1.0 kgf, 2.0 kgf, and 3.0 kgf.

(Thermal Treatment)

A thermal treatment was performed to eliminate the influence of strain caused by the scratching. The thermal treatment was performed by retaining the glass sheets at cooling start temperatures shown in Tables 1 to 3 for 1 hour, and cooling the glass sheets down to the room temperature at cooling rates shown in Tables 1 to 3.

(Bending Test)

A four-point bending jig with a load side (upper) span of 10 mm and a support side (lower) span of 30 mm was used. A tape was pasted to the opposite surface to the scratched surface of the glass which was scratched and subjected to the thermal treatment. A load was applied with the scratched surface down (the taped surface up). Thus, the load with which the glass sheet was crushed was measured. The stress at the crushing time was obtained from the measured load by use of the following expression (10).

$$\sigma = (3F(Ls - LI))/(2wh^2) \quad (10)$$

Here, σ designates the stress (MPa) at the crushing time, F designates the load (N) at the crushing time, Ls designates the distance (mm) between lower portion supporting points, LI designates the distance between upper portion load points, w designates the sample width, and h designates the sample thickness (mm).

(Observation of Fracture Surface)

A fracture surface was observed by use of a digital microscope (VHX-5000 made by Keyence Corporation), and a distance R from a fracture origin to the interface between a mirror surface and a mist surface was measured. The fracture surface of the sample was set to be perpendicular to the optical axis of a lens of the microscope during the observation. The observation was performed at a magnification of 20×150 times.

From the result obtained in the aforementioned procedure, a mirror constant A was obtained by use of the following expression $$\sigma = A/R^{1/2}$$

<Strengthening Treatment>

Each glass was heated at Tg+90° C. in an electric furnace. The glass was taken out from the electric furnace immediately after the glass surface reached Tg+90° C. The glass was rapidly cooled. Thus, an air-cooling tempering treatment was performed. The heating time was about 5 minutes at the longest.

<CS and DOL>

The surface compressive stress (CS) and the depth of compressive stress layer (DOL) of the glass which is subjected to the strengthening treatment were calculated in the following procedure.

For the glass of Example 16, laser light was made to enter the glass through the surface of the glass by use of a scattered-light photoelastic analyzer (SLP-1000 made by Orihara Manufacturing Co., Ltd.), and a stress and a stress layer depth in the glass were obtained from intensity of scattered light thereof. On the other hand, a section of the glass was cut and ground to be thin, and the birefringence of the glass in the sectional direction was measured. From the value obtained thus, the surface compressive stress CS, the depth of compressive stress layer DOL and the internal tensile stress CT were measured. As a result, it was found that the CS was 80 MPa and the DOL was 400 μm. The other Examples were rapidly cooled to be tempered by air-cooling on the same conditions. For the other Examples, the CS values were calculated on the assumption that each CS was proportional to the value of $\alpha_{LT} \times E$. Since the thicknesses of the prepared glasses are equal, the DOLs were considered to be substantially the same.

<Number of Crushed Pieces, and Size of Largest Crushed Piece>

The number of crushed pieces of each glass after the strengthening treatment was measured in the following procedure.

For each glass sample (10 cm square) after the strengthening treatment, impact was applied to a place 10 mm away from one corner of the sample by an indenter with an angle of 120° by use of an automatic punch (carbide-tip-attached automatic punch M type, made by Niigata Seiki Co., Ltd.). Thus, the sample was crushed. The number of pieces of the crushed glass was regarded as the number of crushed pieces. The number of crushed pieces was regarded as 0 when the glass was not crushed. In addition, the size of the largest crushed piece of the crushed glass was obtained. In Tables 1 to 3, "A" designates a case where the size of the largest crushed piece was smaller than 9 cm², and "B" designates a case where the size of the largest crushed piece was 50 cm² or larger.

TABLE 1

|  |  | Ex. 1 | Ex. 2 | Ex. 3 | Ex. 4 | Ex. 5 | Ex. 6 |
|---|---|---|---|---|---|---|---|
| Composition [mol %] | $SiO_2$ | 75.0 | 75.0 | 75.0 | 75.0 | 75.0 | 75.0 |
|  | $B_2O_3$ | 0 | 0 | 0 | 0 | 0 | 0 |
|  | $Al_2O_3$ | 0 | 0 | 0 | 0 | 0 | 0 |
|  | $P_2O_5$ | 0 | 0 | 0 | 0 | 0 | 0 |
|  | $Li_2O$ | 0 | 0 | 0 | 0 | 0 | 0 |
|  | $Na_2O$ | 15.0 | 15.0 | 15.0 | 15.0 | 15.0 | 15.0 |
|  | $K_2O$ | 0 | 0 | 0 | 0 | 0 | 0 |
|  | MgO | 10 | 0 | 0 | 0 | 0 | 0 |
|  | CaO | 0 | 0 | 0 | 0 | 0 | 0 |
|  | SrO | 0 | 0 | 0 | 0 | 0 | 0 |
|  | BaO | 0 | 0 | 0 | 10.0 | 10.0 | 10.0 |
|  | total | 100.0 | 100.0 | 100.0 | 100.0 | 100.0 | 100.0 |
|  | $\Sigma RO$ | 10.0 | 10.0 | 10.0 | 10.0 | 10.0 | 10.0 |
|  | $\Sigma R_2O$ | 15.0 | 15.0 | 15.0 | 15.0 | 15.0 | 15.0 |
|  | $B_2O_3$ (3-coordinate) | 0 | 0 | 0 | 0 | 0 | 0 |
| Tg [° C.] |  | 543 | 543 | 543 | 490 | 490 | 490 |
| Young's modulus E [GPa] |  | 68 | 68 | 68 | 57 | 57 | 57 |
| Poisson's ratio |  | 0.22 | 0.22 | 0.22 | 0.24 | 0.24 | 0.24 |
| Specific gravity |  | 2.42 | 2.42 | 2.42 | 2.81 | 2.81 | 2.81 |
| Cooling start temperature [° C.] |  | 543 | 573 | 603 | 490 | 520 | 550 |
| Cooling rate [° C./min] |  | 1 | 100 | 100 | 1 | 150 | 120 |
| Fictive temperature $T_f$ [° C.] |  | 543 | 573 | 603 | 490 | 520 | 550 |
| Mirror constant A [MPa · m$^{0.5}$] |  | 1.80 | 1.57 | 1.39 | 1.68 | 1.46 | 1.29 |
| G |  | −0.40 | −0.40 | −0.40 | −0.69 | −0.69 | −0.69 |
| H |  | — | — | — | — | — | — |
| I |  | 0.14 | 0.14 | 0.14 | 0.14 | 0.14 | 0.14 |
| J |  | — | — | — | — | — | — |
| Sheet thickness t [mm] |  | 2.0 | 2.0 | 2.0 | 2.0 | 2.0 | 2.0 |
| $\Sigma MiRiO/\Sigma RiO$ |  | 24 | 24 | 24 | 137 | 137 | 137 |
| $\Sigma MiRi_2O/\Sigma Ri_2O$ |  | 23 | 23 | 23 | 23 | 23 | 23 |
| $\alpha_{LT}$ [10$^7$K$^{-1}$] |  | 88 | 88 | 88 | 97 | 97 | 97 |
| $\alpha_{HT}$ [10$^7$K$^{-1}$] |  | (371) | (371) | (371) | (371) | (371) | (371) |
| $\alpha_{HT}/\alpha_{LT}$ |  | 4.2 | 4.2 | 4.2 | 3.8 | 3.8 | 3.8 |
| $\alpha_{LT} \times E$ [10$^4$ PaK$^{-1}$] |  | 60 | 60 | 60 | 55 | 55 | 55 |
| Surface compressive stress CS [MPa] |  | 100 | 100 | 100 | 105 | 105 | 105 |
| t × CS |  | 200 | 200 | 200 | 210 | 210 | 210 |
| DOL [μm] |  | 400 | 400 | 400 | 400 | 400 | 400 |
| Number of crushed pieces |  | >10 | >10 | >10 | >50 | >50 | >50 |
| Size of largest crushed piece [cm²] |  | A | A | A | A | A | A |

TABLE 1-continued

|  |  | Ex. 7 | Ex. 8 | Ex. 9 | Ex. 10 | Ex. 11 |
| --- | --- | --- | --- | --- | --- | --- |
| Composition [mol %] | $SiO_2$ | 46.0 | 46.0 | 46.0 | 76.0 | 76.0 |
|  | $B_2O_3$ | 0 | 0 | 0 | 0 | 0 |
|  | $Al_2O_3$ | 0 | 0 | 0 | 2.0 | 2.0 |
|  | $P_2O_5$ | 3.0 | 3.0 | 3.0 | 0 | 0 |
|  | $Li_2O$ | 27.0 | 27.0 | 27.0 | 1.5 | 1.5 |
|  | $Na_2O$ | 12.0 | 12.0 | 12.0 | 9 | 9 |
|  | $K_2O$ | 0 | 0 | 0 | 5.0 | 5.0 |
|  | MgO | 0 | 0 | 0 | 0.5 | 0.5 |
|  | CaO | 12.0 | 12.0 | 12.0 | 1.0 | 1.0 |
|  | SrO | 0 | 0 | 0 | 0 | 0 |
|  | BaO | 0 | 0 | 0 | 5.0 | 5.0 |
|  | total | 100.0 | 100.0 | 100.0 | 100.0 | 100.0 |
|  | $\Sigma RO$ | 12.0 | 12.0 | 12.0 | 6.5 | 6.5 |
|  | $\Sigma R_2O$ | 39.0 | 39.0 | 39.0 | 15.5 | 15.5 |
|  | $B_2O_3$ (3-coordinate) | 0 | 0 | 0 | 0 | 0 |
| Tg [° C.] |  | 391 | 391 | 391 | 470 | 470 |
| Young's modulus E [GPa] |  | 88 | 88 | 88 | 68 | 68 |
| Poisson's ratio |  | 0.26 | 0.26 | 0.26 | 0.22 | 0.22 |
| Specific gravity |  | 2.53 | 2.53 | 2.53 | 2.58 | 2.58 |
| Cooling start temperature [° C.] |  | 391 | 421 | 451 | 470 | 500 |
| Cooling rate [° C./min] |  | 1 | 110 | 150 | 1 | 105 |
| Fictive temperature $T_f$ [° C.] |  | 391 | 421 | 451 | 470 | 500 |
| Mirror constant A [$MPa \cdot m^{0.5}$] |  | 1.85 | 1.61 | 1.42 | 1.70 | 1.48 |
| G |  | −0.40 | −0.40 | −0.40 | −0.46 | −0.46 |
| H |  | — | — | — | — | — |
| I |  | 0.17 | 0.17 | 0.17 | 0.15 | 0.15 |
| J |  | — | — | — | — | — |
| Sheet thickness t [mm] |  | 2.0 | 2.0 | 2.0 | 2.0 | 2.0 |
| $\Sigma MiRiO/\Sigma RiO$ |  | 40 | 40 | 40 | 114 | 114 |
| $\Sigma MiRi_2O/\Sigma Ri_2O$ |  | 12 | 12 | 12 | 27 | 27 |
| $\alpha_{LT}$ [$10^7 K^{-1}$] |  | 164 | 164 | 164 | 91 | 91 |
| $\alpha_{HT}$ [$10^7 K^{-1}$] |  | (853) | (853) | (853) | (321) | (321) |
| $\alpha_{HT}/\alpha_{LT}$ |  | 5.2 | 5.2 | 5.2 | 3.5 | 3.5 |
| $\alpha_{LT} \times E$ [$10^4 PaK^{-1}$] |  | 145 | 145 | 145 | 62 | 62 |
| Surface compressive stress CS [MPa] |  | 130 | 130 | 130 | 102 | 102 |
| t × CS |  | 260 | 260 | 260 | 204 | 204 |
| DOL [μm] |  | 388 | 388 | 388 | 400 | 400 |
| Number of crushed pieces |  | >10 | >10 | >10 | >50 | >50 |
| Size of largest crushed piece [$cm^2$] |  | A | A | A | A | A |

TABLE 2

|  |  | Ex. 12 | Ex. 13 | Ex. 14 | Ex. 15 | Ex. 16 | Ex. 17 | Ex. 18 | Ex. 19 | Ex. 20 | Ex. 21 |
| --- | --- | --- | --- | --- | --- | --- | --- | --- | --- | --- | --- |
| Composition [mol %] | $SiO_2$ | 76.0 | 63.0 | 63.0 | 63.0 | 75.0 | 75.0 | 75.0 | 75.0 | 75.0 | 75.0 |
|  | $B_2O_3$ | 0 | 0 | 0 | 0 | 0 | 0 | 0 | 0 | 0 | 0 |
|  | $al_2O_3$ | 2.0 | 0 | 0 | 0 | 0 | 0 | 0 | 0 | 0 | 0 |
|  | $P_2O_5$ | 0 | 0 | 0 | 0 | 0 | 0 | 0 | 0 | 0 | 0 |
|  | $Li_2O$ | 1.5 | 0 | 0 | 0 | 0 | 0 | 0 | 0 | 0 | 0 |
|  | $Na_2O$ | 9.0 | 10.0 | 10.0 | 10.0 | 10.0 | 10.0 | 10.0 | 10.0 | 10.0 | 10.0 |
|  | $K_2O$ | 5.0 | 12.0 | 12.0 | 12.0 | 0 | 0 | 0 | 5.0 | 5.0 | 5.0 |
|  | MgO | 0.5 | 7.0 | 7.0 | 7.0 | 0 | 0 | 0 | 0 | 0 | 0 |
|  | CaO | 1.0 | 8.0 | 8.0 | 8.0 | 15.0 | 15.0 | 15.0 | 0 | 0 | 0 |
|  | SrO | 0 | 0 | 0 | 0 | 0 | 0 | 0 | 0 | 0 | 0 |
|  | BaO | 5.0 | 0 | 0 | 0 | 0 | 0 | 0 | 10.0 | 10.0 | 10.0 |
|  | total | 100.0 | 100.0 | 100.0 | 100.0 | 100.0 | 100.0 | 100.0 | 100.0 | 100.0 | 100.0 |
|  | $\Sigma RO$ | 6.5 | 15.0 | 15.0 | 15.0 | 15.0 | 15.0 | 15.0 | 10.0 | 10.0 | 10.0 |
|  | $\Sigma R_2O$ | 15.5 | 22.0 | 22.0 | 22.0 | 10.0 | 10.0 | 10.0 | 15.0 | 15.0 | 15.0 |
|  | $B_2O_3$ (3-coordinate) | 0 | 0 | 0 | 0 | 0 | 0 | 0 | 0 | 0 | 0 |

TABLE 2-continued

|  | Ex. 12 | Ex. 13 | Ex. 14 | Ex. 15 | Ex. 16 | Ex. 17 | Ex. 18 | Ex. 19 | Ex. 20 | Ex. 21 |
|---|---|---|---|---|---|---|---|---|---|---|
| $T_g$ [° C.] | 470 | 481 | 481 | 481 | 539 | 539 | 539 | 466 | 466 | 466 |
| Young's modulus E [GPa] | 68 | 70 | 70 | 70 | 71 | 71 | 71 | 65 | 65 | 65 |
| Poisson's ratio | 0.22 | 0.25 | 0.25 | 0.25 | 0.23 | 0.23 | 0.23 | 0.24 | 0.24 | 0.24 |
| Specific gravity | 2.58 | 2.52 | 2.52 | 2.52 | 2.49 | 2.49 | 2.49 | 2.77 | 2.77 | 2.77 |
| Cooling start temperature [° C.] | 530 | 481 | 511 | 541 | 539 | 569 | 599 | 466 | 496 | 526 |
| Cooling rate [° C./min] | 160 | 1 | 130 | 100 | 1 | 170 | 200 | 1 | 100 | 120 |
| Fictive temperature $T_f$ [° C.] | 530 | 481 | 511 | 541 | 539 | 569 | 599 | 466 | 496 | 526 |
| Mirror constant A [MPa·m$^{0.5}$] | 1.31 | 1.80 | 1.56 | 1.38 | 1.74 | 1.52 | 1.34 | 1.65 | 1.44 | 1.27 |
| G | −0.46 | −0.54 | −0.54 | −0.54 | −0.37 | −0.37 | −0.37 | −0.58 | −0.58 | −0.58 |
| H | — | — | — | — | — | — | — | — | — | — |
| I | 0.15 | 0.21 | 0.21 | 0.21 | 0.21 | 0.21 | 0.21 | 0.14 | 0.14 | 0.14 |
| J | — | — | — | — | — | — | — | — | — | — |
| Sheet thickness t [mm] | 2.0 | 2.0 | 2.0 | 2.0 | 2.0 | 2.0 | 2.0 | 2.0 | 2.0 | 2.0 |
| ΣMiRiO/ΣRiO | 114 | 33 | 33 | 33 | 40 | 40 | 40 | 137 | 137 | 137 |
| ΣMiRi$_2$O/ΣRi$_2$O | 27 | 32 | 32 | 32 | 23 | 23 | 23 | 28 | 28 | 28 |
| $\alpha_{LT}$ [10$^7$K$^{-1}$] | 91 | 133 | 133 | 133 | 78 | 78 | 78 | (97) | (97) | (97) |
| $\alpha_{HT}$ [10$^7$K$^{-1}$] | (321) | 399 | 399 | 399 | 409 | 409 | 409 | (371) | (371) | (371) |
| $\alpha_{HT}/\alpha_{LT}$ | 3.5 | 3 | 3 | 3 | 5 | 5 | 5 | 3.8 | 3.8 | 3.8 |
| $\alpha_{LT}$ [10$^4$ PaK$^{-1}$] | 62 | 93 | 93 | 93 | 55 | 55 | 55 | 63 | 63 | 63 |
| Surface compressive stress CS [MPa] | 102 | 100 | 100 | 100 | 103 | 103 | 103 | 98 | 98 | 98 |
| t × CS | 204 | 200 | 200 | 200 | 206 | 206 | 206 | 196 | 196 | 196 |
| DOL [μm] | 400 | 400 | 400 | 400 | 406 | 406 | 406 | 350 | 350 | 350 |
| Number of crushed pieces | >50 | >30 | >30 | >30 | 51 | 51 | 51 | >20 | >20 | >20 |
| Size of largest crushed piece [cm$^2$] | A | A | A | A | A | A | A | A | A | A |

TABLE 3

|  |  | Ex. 22 | Ex. 23 | Ex. 24 | Ex. 25 | Ex. 26 | Ex. 27 |
|---|---|---|---|---|---|---|---|
| Composition [mol %] | SiO$_2$ | 60.0 | 60.0 | 38.0 | 38.0 | 60.0 | 60.0 |
|  | B$_2$O$_3$ | 10.0 | 10.0 | 0 | 0 | 25.0 | 25.0 |
|  | Al$_2$O$_3$ | 10.0 | 10.0 | 17.0 | 17.0 | 0 | 0 |
|  | P$_2$O$_5$ | 0 | 0 | 0 | 0 | 0 | 0 |
|  | Li$_2$O | 0 | 0 | 11.0 | 11.0 | 0 | 0 |
|  | Na$_2$O | 20.0 | 20.0 | 1.0 | 1.0 | 15.0 | 15.0 |
|  | K$_2$O | 0 | 0 | 0 | 0 | 0 | 0 |
|  | MgO | 0 | 0 | 23.0 | 23.0 | 0 | 0 |
|  | CaO | 0 | 0 | 4.0 | 4.0 | 0 | 0 |
|  | SrO | 0 | 0 | 4.0 | 4.0 | 0 | 0 |
|  | BaO | 0 | 0 | 2.0 | 2.0 | 0 | 0 |
|  | total | 100.0 | 100.0 | 100.0 | 100.0 | 100.0 | 100.0 |
|  | ΣRO | 0 | 0 | 33.0 | 33.0 | 0 | 0 |
|  | ΣR$_2$O | 20.0 | 20.0 | 12 | 12.0 | 15.0 | 15.0 |
|  | B$_2$O$_3$ (3-coordinate) | 0 | 0 | 0 | 0 | 10.0 | 10.0 |
| $T_g$ [° C.] |  | 590 | 590 | 591 | 591 | 523 | 523 |
| Young's modulus E [GPa] |  | 69.6 | 69.6 | 107 | 107 | 77.5 | 77.5 |
| Poisson's ratio |  | 0.24 | 0.24 | 0.27 | 0.27 | 0.22 | 0.22 |
| Specific gravity |  | 2.47 | 2.47 | 2.83 | 2.83 | 2.41 | 2.41 |
| Cooling start temperature [° C.] |  | 620 | 650 | 591 | 621 | 523 | 553 |
| Cooling rate [° C./min] |  | 150 | 200 | 1 | 100 | 1 | 200 |
| Fictive temperature $T_f$ [° C.] |  | 620 | 650 | 591 | 621 | 523 | 553 |
| Mirror constant A [MPa·m$^{0.5}$] |  | 1.78 | 1.58 | 2.54 | 2.21 | 2.71 | 2.36 |
| G |  | — | — | 0.42 | 0.42 | — | — |
| H |  | 0.21 | 0.21 | — | — | 0.88 | 0.88 |
| I |  | — | — | 0.97 | 0.97 | — | — |
| J |  | 0.31 | 0.31 | — | — | 0.78 | 0.78 |
| Sheet thickness t [mm] |  | 2.0 | 2.0 | 2.0 | 2.0 | 2.0 | 2.0 |
| ΣMiRiO/ΣRiO |  | — | — | 41 | 41 | — | — |
| ΣMiRi$_2$O/ΣRi$_2$O |  | 22.99 | 22.99 | 8 | 8 | 22.99 | 22.99 |

TABLE 3-continued

| | | | | | | |
|---|---|---|---|---|---|---|
| $\alpha_{LT}$ [$10^7$K$^{-1}$] | 87 | 87 | (74) | (74) | 60 | 60 |
| $\alpha_{HT}$ [$10^7$K$^{-1}$] | 670 | 670 | (702) | (702) | 391 | 391 |
| $\alpha HT/\alpha LT$ | 8 | 8 | 9.5 | 9.5 | 7 | 7 |
| $\alpha_{LT} \times E$ [$10^4$P PaK$^{-1}$] | 61 | 61 | 80 | 80 | 46 | 46 |
| Surface compressive stress CS [MPa] | 112 | 112 | 132 | 132 | 113 | 113 |
| t × CS | 224 | 224 | 264 | 264 | 226 | 226 |
| DOL [μm] | 333 | 333 | 411 | 411 | 403 | 403 |
| Number of crushed pieces | 45 | >50 | 5 | 5 | 3 | 3 |
| Size of largest crushed piece [cm$^2$] | A | A | B | B | B | B |

| | | Ex. 28 | Ex. 29 | Ex. 30 | Ex. 31 |
|---|---|---|---|---|---|
| Composition [mol %] | SiO$_2$ | 60.0 | 60.0 | 60.0 | 60.0 |
| | B$_2$O$_3$ | 25.0 | 20.0 | 20.0 | 20.0 |
| | Al$_2$O$_3$ | 0 | 0 | 0 | 0 |
| | P$_2$O$_5$ | 0 | 0 | 0 | 0 |
| | Li$_2$O | 0 | 0 | 0 | 0 |
| | Na$_2$O | 15.0 | 15.0 | 15.0 | 15.0 |
| | K$_2$O | 0 | 0 | 0 | 0 |
| | MgO | 0 | 0 | 0 | 0 |
| | CaO | 0 | 0 | 0 | 0 |
| | SrO | 0 | 0 | 0 | 0 |
| | BaO | 0 | 5 | 5 | 5 |
| | total | 100.0 | 100.0 | 100.0 | 100.0 |
| | ΣRO | 0 | 5.0 | 5.0 | 5.0 |
| | ΣR$_2$O | 15.0 | 15.0 | 15.0 | 15.0 |
| | B$_2$O$_3$ (3-coordinate) | 10.0 | 5.0 | 5.0 | 5.0 |
| Tg [° C.] | | 523 | 590 | 590 | 590 |
| Young's modulus E [GPa] | | 77.5 | 85.2 | 85.2 | 85.2 |
| Poisson's ratio | | 0.22 | 0.23 | 0.23 | 0.23 |
| Specific gravity | | 2.41 | 2.68 | 2.68 | 2.68 |
| Cooling start temperature [° C.] | | 583 | 590 | 620 | 650 |
| Cooling rate [° C./min] | | 120 | 1 | 90 | 200 |
| Fictive temperature T$_f$ [° C.] | | 583 | 590 | 620 | 650 |
| Mirror constant A [MPa · m$^{0.5}$] | | 2.08 | 2.67 | 2.32 | 2.05 |
| G | | — | — | — | — |
| H | | 0.88 | 0.81 | 0.81 | 0.81 |
| I | | — | — | — | — |
| J | | 0.78 | 0.62 | 0.62 | 0.62 |
| Sheet thickness t [mm] | | 2.0 | 2.0 | 2.0 | 2.0 |
| ΣMiRiO/ΣRiO | | — | 137.3 | 137.3 | 137.3 |
| ΣMiRi$_2$O/ΣRi$_2$O | | 22.99 | 22.99 | 22.99 | 22.99 |
| $\alpha_{LT}$ [$10^7$K$^{-1}$] | | 60 | 80 | 80 | 80 |
| $\alpha_{HT}$ [$10^7$K$^{-1}$] | | 391 | 886 | 886 | 886 |
| $\alpha_{HT}/\alpha_{LT}$ | | 7 | 11 | 11 | 11 |
| $\alpha_{LT} \times E$ [$10^4$P PaK$^{-1}$] | | 46 | 68 | 68 | 68 |
| Surface compressive stress CS [MPa] | | 113 | 144 | 144 | 144 |
| t × CS | | 226 | 288 | 288 | 288 |
| DOL [μm] | | 403 | 333 | 333 | 333 |
| Number of crushed pieces | | 3 | 0 | 0 | 0 |
| Size of largest crushed piece [cm$^2$] | | B | B | B | B |

In each of the strengthened glasses of Examples 1 to 23 whose mirror constants A were 1.97 MPa·m$^{0.5}$ or less, the size of the largest crushed piece was less than 9 cm$^2$, and the crushed pieces were small. On the other hand, in each of the strengthened glasses of Examples 24 to 31 whose mirror constants A exceeded 1.97 MPa·m$^{0.5}$, the size of the largest crushed piece was 50 cm$^2$ or more, and the crushed pieces were large.

Although the present invention has been described in detail and with reference to its specific embodiments, it is obvious for those in the art that various changes or modifications can be made without departing from the spirit and scope of the present invention.

The present application is based on Japanese Patent Application No. 2017-138873 filed on Jul. 18, 2017, the contents of which are incorporated herein by reference.

INDUSTRIAL APPLICABILITY

A strengthened glass according to the present invention can be used suitably, for example, as a window glass for a vehicle, a window glass for a building, an external wall, or a cover glass for a solar cell, or particularly as a window glass for an automobile.

The invention claimed is:

1. A strengthened glass having a mirror constant A of 1.82 MPa·m$^{0.5}$ or less, a surface compressive stress (CS) of 10 MPa or more, wherein a product (t×CS) of a sheet thickness t (unit: mm) and the CS (unit: MPa) is less than 230.

2. The strengthened glass according to claim 1, wherein a fictive temperature at a central portion in a sheet thickness t direction of the glass is not lower than a glass transition temperature Tg of the glass and is Tg+100° C. or lower.

3. The strengthened glass according to claim 1, wherein a tensile stress CT at a central portion in a sheet thickness t direction of the glass is 5 MPa or more.

4. The strengthened glass according to claim 3, wherein a quotient (CT/A) of the tensile stress CT (unit: MPa) and the mirror constant A (unit: MPa·m$^{0.5}$) is 2.5 m$^{-0.5}$ or more.

5. The strengthened glass according to claim 1, wherein a depth of compressive stress layer DOL is (1/10)×t mm or more when the sheet thickness is t (unit: mm).

6. The strengthened glass according to claim 1, wherein the sheet thickness t is 1.2 mm or more and 50 mm or less.

7. The strengthened glass according to claim 1, comprising, as represented by mole percentage based on oxides, 40 to 85% of $SiO_2$, 0 to 15% of $Al_2O_3$, 0 to 5% of $P_2O_5$, 8 to 40% of alkali metal oxides ($R_2O$) in total, and 0 to 20% of alkaline-earth metal oxides (RO) in total, and not substantially comprising $B_2O_3$.

8. The strengthened glass according to claim 7, wherein a Poisson's ratio v of the glass is 0.18 or higher.

9. The strengthened glass according to claim 7, wherein G expressed by the following expression is −0.33 or less:

$$G=E\times0.013+v\times(-6.6)+[Al_2O_3]\times0.023+\Sigma RO\times0.013,$$

in the expression, E designates a Young's modulus (GPa) of the glass, v designates a Poisson's ratio of the glass, [$Al_2O_3$] designates a content of $Al_2O_3$ (mole percentage based on oxides) in the glass, and ΣRO designates a total content of alkaline-earth metal oxides (mole percentage based on oxides) in the glass.

10. The strengthened glass according to claim 7, wherein I expressed by the following expression is 0.30 or less:

$$I=[Al_2O_3]\times0.03+\Sigma RO\times0.014,$$

in the expression, [$Al_2O_3$] designates a content of $Al_2O_3$ (mole percentage based on oxides) in the glass, and ΣRO designates a total content of alkaline-earth metal oxides (mole percentage based on oxides) in the glass.

11. The strengthened glass according to claim 1, comprising, as represented by mole percentage based on oxides, 40 to 85% of $SiO_2$, 0.1 to 20% of $B_2O_3$, 0 to 5% of $P_2O_5$, 5 to 40% of alkali metal oxides ($R_2O$) in total, and 0 to 15% of alkaline-earth metal oxides (RO) in total.

12. The strengthened glass according to claim 11, wherein H expressed by the following expression is 0.30 or less:

$$H=B_2O_3(\text{3-coordinate})\times0.039+E\times0.036+\Sigma RO\times(-0.030)-2.3,$$

in the expression, $B_2O_3$(3-coordinate) designates a content of 3-coordinate boron (mole percentage based on oxides) in the glass, E designates a Young's modulus (GPa) of the glass, and ΣRO designates a total content of alkaline-earth metal oxides (mole percentage based on oxides) in the glass.

13. The strengthened glass according to claim 11, wherein J expressed by the following expression is 0.33 or less:

$$J=[B_2O_3]\times0.031-0.026\times[K_2O],$$

in the expression, [$B_2O_3$] designates a content of $B_2O_3$ (mole percentage based on oxides) in the glass, and [$K_2O$] designates a content of $K_2O$ (mole percentage based on oxides) in the glass.

14. The strengthened glass according to claim 1, wherein a Young's modulus E of the glass is 55 GPa or more and 100 GPa or less.

15. The strengthened glass according to claim 1, wherein a low temperature coefficient of thermal expansion $\alpha_{LT}$ of the glass is 60×10$^{-7}$·K$^{-1}$ or more, provided that an average coefficient of thermal expansion at 50 to 350° C. is the low temperature coefficient of thermal expansion $\alpha_{LT}$.

16. The strengthened glass according to claim 15, wherein a ratio $\alpha_{HT}/\alpha_{LT}$ of a high temperature coefficient of thermal expansion $\alpha_{HT}$ to the low temperature coefficient of thermal expansion $\alpha_{LT}$ is 2.0 or higher, provided that a maximum value of a coefficient of thermal expansion between a glass transition temperature and a yield temperature is the high temperature coefficient of thermal expansion $\alpha_{HT}$.

17. The strengthened glass according to claim 15, wherein a product $\alpha_{LT}\times E$ of the low temperature coefficient of thermal expansion $\alpha_{LT}$ and a Young's modules E is 5.0×10$^5$ Pa·K$^{-1}$ or more.

18. The strengthened glass according to claim 1, which is an air-cooled tempered glass.

19. The strengthened glass according to claim 7, comprising, as represented by mole percentage based on oxides, 40 to 75% of $SiO_2$, and 7 to 10% of MgO.

20. The strengthened glass according to claim 7, comprising, as represented by mole percentage based on oxides, 63 to 75% of $SiO_2$, 0 to 5% of $Al_2O_3$, 15 to 30% of alkali metal oxides ($R_2O$) in total, 5 to 20% of $Na_2O$, 5 to 20% of $K_2O$, 8 to 10% of CaO, and 7 to 10% of MgO.

* * * * *